United States Patent
Yamada

(10) Patent No.: US 10,239,972 B2
(45) Date of Patent: Mar. 26, 2019

(54) ACTIVE-ENERGY-RAY-CURABLE COMPOSITION, CURED MATERIAL, COMPOSITION STORED CONTAINER, TWO-DIMENSIONAL OR THREE-DIMENSIONAL IMAGE FORMING APPARATUS, AND TWO-DIMENSIONAL OR THREE-DIMENSIONAL IMAGE FORMING METHOD

(71) Applicant: Hiroaki Yamada, Chiba (JP)

(72) Inventor: Hiroaki Yamada, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 5 days.

(21) Appl. No.: 15/422,068

(22) Filed: Feb. 1, 2017

(65) Prior Publication Data

US 2017/0253680 A1 Sep. 7, 2017

(30) Foreign Application Priority Data

Mar. 2, 2016 (JP) ................................ 2016-039618

(51) Int. Cl.

| | | |
|---|---|---|
| *C08F 120/40* | (2006.01) | |
| *C08F 136/20* | (2006.01) | |
| *B33Y 10/00* | (2015.01) | |
| *B33Y 30/00* | (2015.01) | |
| *B29C 35/08* | (2006.01) | |
| *B41J 2/175* | (2006.01) | |
| *C09D 147/00* | (2006.01) | |

(Continued)

(52) U.S. Cl.
CPC ........ *C08F 136/20* (2013.01); *B29C 35/0805* (2013.01); *B33Y 10/00* (2014.12); *B33Y 30/00* (2014.12); *B41J 2/17503* (2013.01); *C08F 2/48* (2013.01); *C08F 120/40* (2013.01); *C09D 147/00* (2013.01); *B29C 64/112* (2017.08); *B29C 2035/0827* (2013.01); *B29K 2033/04* (2013.01); *B33Y 70/00* (2014.12); *B41J 11/002* (2013.01); *B41J 2202/03* (2013.01); *C08F 2220/185* (2013.01); *C08F 2222/1013* (2013.01)

(58) Field of Classification Search
CPC ....... B33Y 70/00; C09D 11/30; C09D 11/102; C09D 11/101; C08F 2/50; C08F 2/52; C08F 2222/1013; C08F 2220/185; C08F 2/48; C08F 120/40; B41J 2/17503
See application file for complete search history.

(56) References Cited

U.S. PATENT DOCUMENTS

| | | | | |
|---|---|---|---|---|
| 9,670,373 | B2 * | 6/2017 | Madsen | .................... C08F 2/50 |
| 9,708,425 | B2 * | 7/2017 | Madsen | ................ C08F 120/18 |

(Continued)

FOREIGN PATENT DOCUMENTS

| | | |
|---|---|---|
| JP | 2005-154615 | 6/2005 |
| JP | 2005-350551 | 12/2005 |

(Continued)

*Primary Examiner* — Sanza L. McClendon
(74) *Attorney, Agent, or Firm* — Oblon, McClelland, Maier & Neustadt, L.L.P.

(57) ABSTRACT

An active-energy-ray-curable composition including: polymerizable monomer (A1) containing one (meth)acryloyl group; acylphosphine oxide-based polymerization initiator (B1); and acridone-based polymerization initiator (B2), an amount of the polymerizable monomer (A1) containing one (meth)acryloyl group being from 50.0% by mass through 99.8% by mass.

15 Claims, 2 Drawing Sheets

(51) Int. Cl.
*C08F 2/48* (2006.01)
*B33Y 70/00* (2015.01)
*B29K 33/04* (2006.01)
*B41J 11/00* (2006.01)
*C08F 220/18* (2006.01)
*C08F 222/10* (2006.01)
*B29C 64/112* (2017.01)

(56) References Cited

U.S. PATENT DOCUMENTS

| | | |
|---|---|---|
| 2006/0141392 A1 | 6/2006 | Yoon et al. |
| 2015/0009265 A1 | 1/2015 | Kohzuki et al. |
| 2015/0077481 A1 | 3/2015 | Yoshino et al. |
| 2015/0105488 A1* | 4/2015 | Madsen ............ C08G 18/4833 522/35 |
| 2015/0130878 A1 | 5/2015 | Kohzuki et al. |
| 2015/0232675 A1 | 8/2015 | Yoshino et al. |
| 2016/0009931 A1 | 1/2016 | Kohzuki et al. |
| 2016/0075895 A1 | 3/2016 | Kohzuki et al. |
| 2016/0326387 A1 | 11/2016 | Arita et al. |
| 2016/0347961 A1 | 12/2016 | Kobayashi et al. |
| 2017/0015850 A1 | 1/2017 | Yoshino et al. |

FOREIGN PATENT DOCUMENTS

| | | |
|---|---|---|
| JP | 2006-154825 | 6/2006 |
| JP | 2012-236885 | 12/2012 |
| JP | 2013-241580 | 12/2013 |
| JP | 2014-024980 | 2/2014 |
| JP | 2014-125557 | 7/2014 |

\* cited by examiner

ACTIVE-ENERGY-RAY-CURABLE
COMPOSITION, CURED MATERIAL,
COMPOSITION STORED CONTAINER,
TWO-DIMENSIONAL OR
THREE-DIMENSIONAL IMAGE FORMING
APPARATUS, AND TWO-DIMENSIONAL OR
THREE-DIMENSIONAL IMAGE FORMING
METHOD

CROSS-REFERENCE TO RELATED
APPLICATIONS

The present application claims priority under 35 U.S.C. § 119 to Japanese Patent Application No. 2016-039618, filed Mar. 2, 2016. The contents of which are incorporated herein by reference in their entirety.

BACKGROUND OF THE INVENTION

Field of the Invention

The present disclosure relates to an active-energy-ray-curable composition, a cured material, a composition stored container, a two-dimensional or three-dimensional image forming apparatus, and a two-dimensional or three-dimensional image forming method.

Description of the Related Art

In the active-energy-ray-curable-type inkjet printing method, radical polymerizable inks and cationic polymerizable inks have been used. Among them, the radical polymerizable inks have widely been used in terms of production cost and storage stability of the ink.

In order to improve productivity of inkjet printing, there is a need for an active-energy-ray-curable-type radical polymerizable ink that is cured at high speed with a small amount of energy.

As the composition suitable for the radical polymerizable ink, known is a composition including a polymerization initiator that includes a polymerizable monomer (e.g., (meth)acrylic acid ester) as a main component and generates radicals through irradiation of active energy rays. In order to be cured at high speed with a small amount of energy, there has been a proposed inkjet ink obtained by using the aforementioned composition (see, for example, Japanese Unexamined Patent Application Publication Nos. 2005-350551 and 2014-125557).

Moreover, there has been proposed a composition including an acylphosphine oxide-based polymerization initiator and an acridone-based polymerization initiator (see, for example, Japanese Unexamined Patent Application Publication No. 2006-154825).

SUMMARY OF THE INVENTION

According to one aspect of the present disclosure, an active-energy-ray-curable composition includes: polymerizable monomer (A1) containing one (meth)acryloyl group; acylphosphine oxide-based polymerization initiator (B1); and acridone-based polymerization initiator (B2). An amount of the polymerizable monomer (A1) containing one (meth)acryloyl group is from 50.0% by mass through 99.8% by mass.

DESCRIPTION OF THE EMBODIMENTS (Active-Energy-Ray-Curable Composition)

Figure 1:
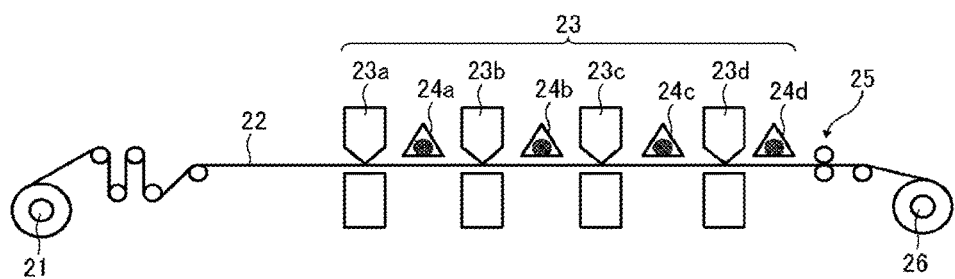
FIG. 1 is a schematic view of an example of an image forming apparatus of the present disclosure.

An active-energy-ray-curable composition of the present disclosure is an active-energy-ray-curable composition including the following components.

polymerizable monomer (A1) containing one (meth)acryloyl group: from 50.0% by mass through 99.8% by mass Acylphosphine oxide-based polymerization initiator (B1)

Acridone-based polymerization initiator (B2)

In the present disclosure, the (meth)acryloyl group refers to an acryloyl group [$CH_2$=CH—O—] or a methacryloyl group [$CH_2$=C($CH_3$)—CO—]. Similarly, (meth)acrylic acid refers to acrylic acid or methacrylic acid, (meth)acrylic acid ester refers to acrylic acid ester or methacrylic acid ester, (meth)acrylate refers to acrylate or methacrylate, and (meth)acrylamide refers to acrylamide or methacrylamide.

The present disclosure has an object to provide an active-energy-ray-curable composition that can be cured at high speed with a small amount of energy.

According to the present disclosure, it is possible to provide an active-energy-ray-curable composition that can be cured at high speed with a small amount of energy.

Moreover, the active-energy-ray-curable composition of the present disclosure may include, if necessary, polymerizable monomer (A2) containing two or more (meth)acryloyl groups, polymerizable monomer (A3) containing a polymerizable reactive group other than (meth)acryloyl group, polymerization initiator (B3), and other components, which will be described hereinafter.

Hereinafter, each component constituting the active-energy-ray-curable composition of the present disclosure will be described.

<Polymerizable Monomer (A1) Containing One (Meth)acryloyl Group>

The active-energy-ray-curable composition of the present disclosure includes polymerizable monomer (A1) containing one (meth)acryloyl group. As the polymerizable monomer (A1) containing one (meth)acryloyl group, any known compound is preferably used. However, specific examples of the polymerizable monomer (A1) containing one (meth)acryloyl group include (meth)acrylic acid; (meth)acrylic acid esters such as methyl (meth)acrylate, ethyl (meth)acrylate, n-butyl (meth)acrylate, allyl (meth)acrylate, glycidyl (meth)acrylate, 2-(dimethylamino)ethyl (meth)acrylate, 2-hydroxyethyl (meth)acrylate, 2-butoxyethyl (meth)acrylate, ethyl carbitol(meth)acrylate, cyclohexyl (meth)acrylate, tetrahydrofurfuryl (meth)acrylate, 2-(2-vinyloxyethoxy)ethyl (meth)acrylate, benzyl (meth)acrylate, 2-phenoxyethyl (meth)acrylate, 2-hydroxy-3-phenoxypropyl (meth)acrylate, and isobornyl (meth)acrylate; and (meth)acrylamides such as (meth)acryloyl morpholine, N-(hydroxymethyl) (meth)acrylamide, N-(2-hydroxyethyl) (meth)acrylamide, N-[3-(dimethylamino)propyl] (meth)acrylamide, and diacetone (meth)acrylamide.

The polymerizable monomer (A1) containing one (meth) acryloyl group may be used alone or in combination.

A molecular weight of the polymerizable monomer (A1) containing one (meth)acryloyl group is not particularly limited. The polymerizable monomer (A1) containing one (meth)acryloyl group may include compounds that are called oligomers and macromonomers. However, in order to obtain the active-energy-ray-curable composition, which has low viscosity and is excellent in curing ability to be suitably used for inkjet inks, the molecular weight of the polymerizable monomer (A1) containing one (meth)acryloyl group is preferably 1,000 or less, more preferably 500 or less.

An amount of the polymerizable monomer (A1) containing one (meth)acryloyl group contained in the active-energy-ray-curable composition of the present disclosure is needed to be from 50.0% by mass through 99.8% by mass. The amount of the polymerizable monomer (A1) containing one (meth)acryloyl group is preferably from 60.0% by mass through 99.0% by mass, more preferably from 70.0% by mass through 98.0% by mass.

<Acylphosphine Oxide-Based Polymerization Initiator (B1)>

The active-energy-ray-curable composition of the present disclosure includes acylphosphine oxide-based polymerization initiator (B1). As the acylphosphine oxide-based polymerization initiator (B1), any known compound is preferably used. However, preferable examples of the acylphosphine oxide-based polymerization initiator (B1) include phenylbis (2,4,6-trimethylbenzoyl)phosphine=oxide (available from BASF JAPAN LTD., "IRGACURE 819", etc.) and diphenyl (2,4,6-trimethylbenzoyl)phosphine=oxide (available from BASF JAPAN LTD., "IRGACURE TPO", etc.). The acylphosphine oxide-based polymerization initiator (B1) may be used alone or in combination.

An amount of the acylphosphine oxide-based polymerization initiator (B1) contained in the active-energy-ray-curable composition of the present disclosure is preferably from 0.1% by mass through 15.0% by mass, more preferably from 0.5% by mass through 12.0% by mass, still more preferably from 1.0% by mass through 10.0% by mass.

<Acridone-Based Polymerization Initiator (B2)>

The active-energy-ray-curable composition of the present disclosure includes acridone-based polymerization initiator (B2). As the acridone-based polymerization initiator (B2), any known compound is preferably used. However, preferable examples of the acridone-based polymerization initiator (B2) include 10-buthyl-2-chloro-9(10H)-acridone (available from Kurogane Kasei Co., Ltd., "NBCA", etc.). The acridone-based polymerization initiator (B2) may be used alone or in combination.

An amount of the acridone-based polymerization initiator (B2) contained in the active-energy-ray-curable composition of the present disclosure is preferably from 0.1% by mass through 15.0% by mass, more preferably from 0.5% by mass through 12.0% by mass, still more preferably from 1.0% by mass through 10.0% by mass.

The active-energy-ray-curable composition of the present disclosure realizes high curing ability by using the acylphosphine oxide-based polymerization initiator (B1) in combination of the acridone-based polymerization initiator (B2). As the inkjet ink, the composition obtained by using the acylphosphine oxide-based polymerization initiator and the thioxanthone-based polymerization initiator is known (see, for example, Japanese Unexamined Patent Application Publication No. 2012-140583). However, as presented in Examples, which will be described hereinafter, combination of the polymerization initiators of the present disclosure exhibits more excellent curing ability than curing ability of the aforementioned combination.

<Polymerizable Monomer (A2) Containing Two or More (Meth)acryloyl Groups>

The active-energy-ray-curable composition of the present disclosure may include polymerizable monomer (A2) containing two or more (meth)acryloyl groups. As the polymerizable monomer (A2) containing two or more (meth) acryloyl groups, any known compound is preferably used. However, specific examples of the polymerizable monomer (A2) containing two or more (meth)acryloyl groups include: (meth)acrylic acid esters such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, neopentyl glycol di(meth)acrylate, ethoxylated neopentyl glycol di(meth)acrylate, propoxylated neopentyl glycol di(meth)acrylate, 1,6-hexanediol di(meth)acrylate, 1,9-nonanediol di(meth)acrylate, pentaerythritol tri(meth)acrylate, pentaerythritol tetra(meth)acrylate, dipentaerythritol hexa(meth)acrylate, and trimethylolpropane tri(meth)acrylate; urethane (meth)acrylate derivatives obtained by reacting (meth)acrylic acid ester containing a hydroxyl group and a compound containing a plurality of isocyanate groups; and epoxy(meth)acrylate derivatives obtained by reacting (meth) acrylic acid with a compound containing a plurality of epoxy groups.

When the polymerizable monomer (A2) containing two or more (meth)acryloyl groups is contained in the active-energy-ray-curable composition of the present disclosure, an amount of the polymerizable monomer (A2) containing two or more (meth)acryloyl groups is preferably from 0.1% by mass through 49.8% by mass, more preferably from 1.0% by mass through 30.0% by mass.

<Polymerizable Monomer (A3) Containing Polymerizable Reactive Group Other Than (Meth)acryloyl Group>

The active-energy-ray-curable composition of the present disclosure may include polymerizable monomer (A3) containing a polymerizable reactive group other than the (meth) acryloyl group. Examples of the polymerizable reactive group other than the (meth)acryloyl group include, but are not limited to, groups containing a polymerizable unsaturation bond such as a vinyl group, a vinyloxy group, and an allyl group. As the polymerizable monomer (A3) containing a polymerizable reactive group other than the (meth)acryloyl group, any known compound is preferably used. However, specific examples of the polymerizable monomer (A3) containing a polymerizable reactive group other than the (meth) acryloyl group include: N-vinyl compounds such as N-vinyl caprolactam, N-vinylpyrrolidone, and N-vinylformamide; aromatic vinyl compounds such as styrene and α-methylstyrene; vinylethers such as diethylene glycol divinylether, triethylene glycol divinylether, and cyclohexanedimethanol divinylether; and allyl compounds such as allyl glycidyl ether, diallylphthalate, and triallyl trimellitate.

When the polymerizable monomer (A3) containing a polymerizable reactive group other than the (meth)acryloyl group is contained in the active-energy-ray-curable composition of the present disclosure, an amount of the polymerizable monomer (A3) containing a polymerizable reactive group other than the (meth)acryloyl group is preferably from 0.1% by mass through 30.0% by mass, more preferably from 1.0% by mass through 20.0% by mass.

<Other Polymerization Initiators (B3)>

The active-energy-ray-curable composition of the present disclosure can include polymerization initiator (B3) other than the acylphosphine oxide-based polymerization initiator (B1) and the acridone-based polymerization initiator (B2). As the polymerization initiator (B3) other than the acylphosphine oxide-based polymerization initiator (B1) and the acridone-based polymerization initiator (B2), any known compound is preferably used. However, specific examples of the polymerization initiator (B3) include: α-aminoketone-based polymerization initiators such as 2-methyl-1-[4-(methylthio)phenyl]-2-morpholinopropan-1-one, 2-(dimethylamino)-2-[(4-methylphenyl)methyl]-1-(4-morpholinophenyl)butan-1-one; α-hydroxyketone-based polymerization initiators such as 1-hydroxycyclohexyl=phenyl=ketone, 1-[4-(2-hydroxyethoxy)phenyl]-2-hydroxy-2-methylpropan-1-one; oxime ester-based polymerization initiators such as 1-[4-(phenylthio)phenyl]octane-1,2-dione=2-(O-benzoyloxime), 1-[9-ethyl-6-(2-methylbenzoyl)-9H-carbazol-3-yl]ethanone=O-acetyl oxime; thioxanthone-based polymerization initiators such as 2,4-diethylthioxanthone and 2-isopropylthioxanthone; and benzophenone-based polymerization initiators such as benzophenone and 4,4'-bis(diethylamino)benzophenone.

When the polymerization initiator (B3) other than the acylphosphine oxide-based polymerization initiator (B1) and the acridone-based polymerization initiator (B2) is contained in the active-energy-ray-curable composition of the present disclosure, an amount of the polymerization initiator (B3) other than the acylphosphine oxide-based polymerization initiator (B1) and the acridone-based polymerization initiator (B2) is preferably from 0.1% by mass through 15.0% by mass, more preferably from 1.0% by mass through 10.0% by mass.

In order for the polymerizable monomer used in the active-energy-ray-curable composition of the present disclosure to become a composition suitable for an inkjet ink, the active-energy-ray-curable composition necessarily includes the polymerizable monomer (A1) containing one (meth)acryloyl group serving as an essential component. Moreover, depending on viscosity and curing ability of the intended ink, and various properties (hardness, close adhesiveness, optical property, and drawability) of the cured film to be obtained, the polymerizable monomer (A2) containing two or more (meth)acryloyl groups and the polymerizable monomer (A3) containing a polymerizable reactive group other than the (meth)acryloyl group can be appropriately selected depending on the intended purpose.

<Active Energy Rays>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Colorant>

The composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% by mass to 20% by mass relative to the total mass (100% by mass) of the composition. Incidentally, the active-energy-ray-curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The active-energy-ray-curable composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The active-energy-ray-curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Active-Energy-Ray-Curable Composition>

The active-energy-ray-curable composition of the present disclosure can be prepared by using the components described above. The preparation devices and conditions are not particularly limited. For example, the curable-composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Viscosity>

The viscosity of the active-energy-ray-curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1°34'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Application Field>

The application field of the active-energy-ray-curable composition of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, and various optical materials.

Figure 2:
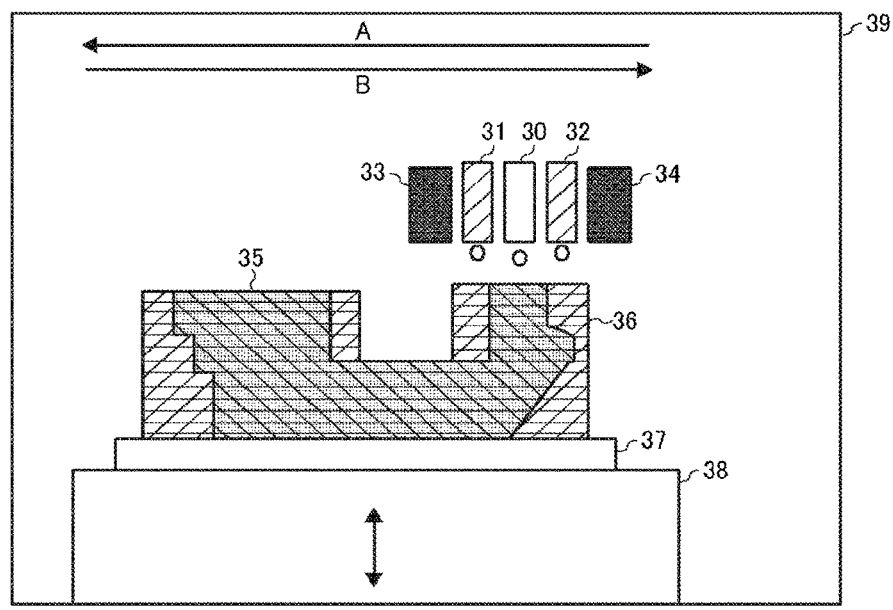
FIG. 2 is a schematic view of an example of another image forming apparatus of the present disclosure.
Figure 3A:
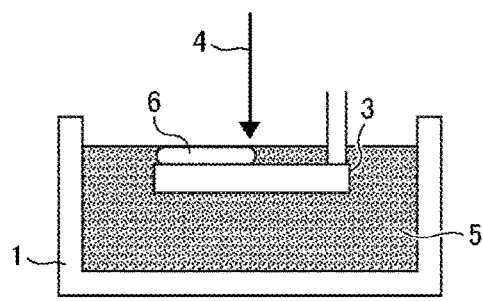
FIG. 3A is a schematic view of an example of still another image forming apparatus of the present disclosure.
Figure 3B:
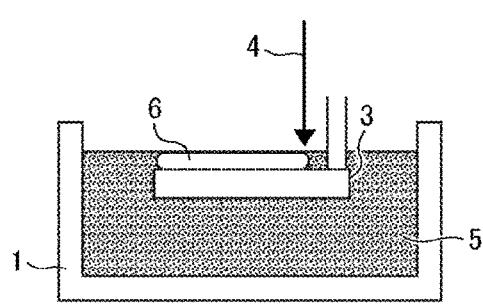
FIG. 3B is a schematic view of an example of still another image forming apparatus of the present disclosure.
Figure 3C:
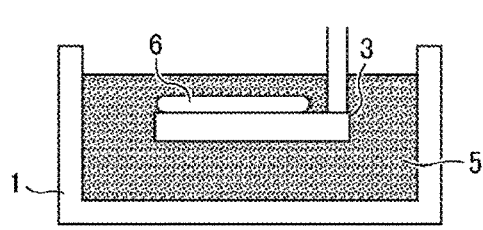
FIG. 3C is a schematic view of an example of still another image forming apparatus of the present disclosure.
Figure 3D:
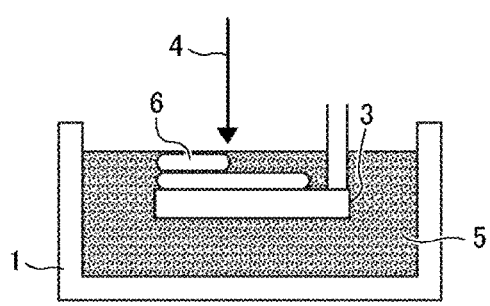
FIG. 3D is a schematic view of an example of still another image forming apparatus of the present disclosure.

Furthermore, the active-energy-ray-curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active-energy-ray-curable composition of the present disclosure one on top of the other by repeating discharging the curable composition to particular areas followed by curing upon irradiation of an active energy ray (details will be described below). FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active energy ray curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<Composition Stored Container>

The composition stored container of the present disclosure contains the active-energy-ray-curable composition and is suitable for the applications as described above. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<Image Forming Method and Image Forming Apparatus>

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the active-energy-ray-curable composition of the present disclosure. The storing part may include the container mentioned above. Furthermore, the method and the apparatus may respectively include a discharging step and a discharging device to discharge the active energy ray curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image.

Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 39 illustrated in FIG. 2 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support and curing these compositions ejects a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction to laminate the supporting layer (or support layer) and the additive manufacturing layer to fabricate a solid object 35. Thereafter, an additive manufacturing support 36 is removed, if desired. Although only a single ejection head unit 30 for additive manufacturing is provided to the image forming apparatus illustrated 39 in FIG. 2, it can have two or more units 30.

EXAMPLES

The present disclosure will be described in more detail by way of the following Examples. However, the technical ranges of the present disclosure should not be construed as being limited to these Examples.

Here, compound names, manufacturing company names, and product names of the various compounds used as components for producing active-energy-ray-curable compositions of Examples and Comparative Examples, are presented in the following Table 1.

TABLE 1

| Components | Abbreviations | Compound names (manufacturing company names and product names) |
| --- | --- | --- |
| Polymerizable monomers (A1) | A1-1 | 2-(2-Vinyloxyethoxy)ethylacrylate (available from NIPPON SHOKUBAI CO., LTD. "VEEA-AI") |
| | A1-2 | 2-Phenoxyethyl acrylate (available from Osaka Organic Chemical Industry Ltd. "VISCOAT #192") |
| | A1-3 | Benzyl acrylate (available from Osaka Organic Chemical Industry Ltd. "VISCOAT #160") |
| | A1-4 | Acryloyl morpholine (availabler from KJ Chemicals Corporation, "ACMO") |
| Polymerizable monomers (A2) | A2-1 | 1,9-Nonanediol diacrylate (available from Osaka Organic Chemical Industry Ltd. "VISCOAT #260") |
| | A2-2 | Diethylene glycol dimethacrylate (available from Shin Nakamura Chemical Co., Ltd., "NK ESTER 2G") |
| Polymerizable monomer (A3) | A3-1 | N-vinylcaprolactam (available from Tokyo Chemical Industry Co., Ltd.) |
| Polymerization initiators (B1) | B1-1 | Phenylbis(2,4,6-trimethylbenzoyl)phosphine = oxide (available from BASF Japan Ltd., "IRGACURE 819") |
| | B1-2 | Diphenyl(2,4,6-trimethylbenzoyl)phosphine = oxide (available from BASF Japan Ltd., "IRGACURE TPO") |
| Polymerization initiator (B2) | B2-1 | 10-Buthyl-2-chloro-9(10H)-acridone (available from Kurogane Kasei Co., Ltd., "NBCA") |
| Polymerization initiators (B3) | B3-1 | 2,4-Diethylthioxantone (available from Nippon Kayaku Co., Ltd., "KAYACURE DETX-S") |
| | B3-2 | 2-(Dimethylamino)-2-[(4-methylphenyl)methyl]-1-(4-morpholinophenyl)butan-1-one (available from BASF Japan Ltd., "IRGACURE 379") |

TABLE 1-continued

| Components | Abbreviations | Compound names (manufacturing company names and product names) |
|---|---|---|
| | B3-3 | 1-Hydroxycyclohexyl-phenyl-ketone (available from BASF Japan Ltd., "IRGACURE 184") |
| Surfactant | | Silicone-based surfactant (available from BYK Additives & Instruments, "BYK-UV3510") |

Example 1

<Preparation of Active-Energy-Ray-Curable Composition 1>

First, 2-(2-vinyloxyethoxy)ethylacrylate (available from NIPPON SHOKUBAI CO., LTD., "VEEA-AI") (98.0% by mass), phenylbis(2,4,6-trimethylbenzoyl)phosphine=oxide (available from BASF JAPAN LTD., "IRGACURE 819") (1.0% by mass), and 10-buthyl-2-chloro-9(10H)-acridone (available from Kurogane Kasei Co., Ltd., "NBCA") (1.0% by mass) were sequentially added and were stirred for 1 hour. It was visually confirmed that there was not any material that remained undissolved. Then, the resultant mixture was filtered using a membrane filter to remove coarse particles to prepare active-energy-ray-curable composition 1.

Examples 2 to 4 and Comparative Examples 1 to 4

<Preparation of Active-Energy-Ray-Curable Compositions 2 to 8>

Active-energy-ray-curable compositions 2 to 8 were prepared in the same manner as in Example 1 except that the formulation and the amounts in Example 1 were changed to formulations and amounts presented in the following Table 2.

The active-energy-ray-curable composition was placed into the gap to form a liquid film having a thickness of 10 μm. While the liquid film was irradiated, from the rear surface of the glass stage, with light using a LED light source ("LIGHTNINGCURE LC-L1", available from Hamamatsu Photonics K.K., wavelength of 365 nm, illuminance of 10 mW/cm$^2$, which was measured on the glass stage using an ultraviolet illuminometer ("UIT-201" available from USHIO INC.)), change in storage elastic modulus of the active-energy-ray-curable composition was observed in a vibration mode. The time (sec), for which the storage elastic modulus reached a constant value due to saturation of an increase in the storage elastic modulus from initiation of light irradiation, was defined as curing time. The amount of light irradiation (mJ/cm$^2$) required for curing the active-energy-ray-curable composition was calculated as a product of the illuminance and the curing time. After the measurement, the liquid film of the active-energy-ray-curable composition became a transparent cured film. The glass stage strongly adhered to the measurement jig via the cured film.

In addition, values of the reached storage elastic modulus (Pa) are also presented in Table 2. Here, the storage elastic modulus of each liquid film before the light irradiation was from 10$^0$ Pa through 10$^1$ Pa.

TABLE 2

| | | Example Nos. | | | | Comparative Example Nos. | | | |
|---|---|---|---|---|---|---|---|---|---|
| | | 1 | 2 | 3 | 4 | 1 | 2 | 3 | 4 |
| Active-energy-ray-curable composition Nos. | | 1 | 2 | 3 | 4 | 5 | 6 | 7 | 8 |
| Polymerizable monomers (A1) | A1-1 | 98.0 | 99.8 | | | 98.0 | 99.8 | | |
| | A1-2 | | | 98.5 | 97.0 | | | 98.5 | 97.0 |
| Polymerization initiators (B1) | B1-1 | 1.0 | | 0.5 | 1.0 | 1.0 | | 0.5 | |
| | B1-2 | | 0.1 | 0.5 | 1.0 | | | 0.5 | |
| Polymerization initiator (B2) | B2-1 | 1.0 | 0.1 | 0.5 | 1.0 | | 0.1 | | |
| Polymerization initiators (B3) | B3-1 | | | | | 1.0 | | 0.5 | |
| | B3-2 | | | | | | 0.1 | | |
| | B3-3 | | | | | | | | 3.0 |
| Total (% by mass) | | 100.0 | 100.0 | 100.0 | 100.0 | 100.0 | 100.0 | 100.0 | 100.0 |
| Evaluations of curing ability | Amount of light irradiation required for curing (mJ/cm$^2$) | 20 | 54 | 172 | 104 | 26 | 74 | 210 | 600 |
| | Reached storage elastic modulus (Pa) | 2 × 10$^5$ | 2 × 10$^5$ | 2 × 10$^5$ | 2 × 10$^5$ | 2 × 10$^5$ | 1 × 10$^5$ | 2 × 10$^5$ | 7 × 10$^4$ |

<Evaluation of Curing Ability of Active-Energy-Ray-Curable Compositions 1 to 8>

Each of the active-energy-ray-curable compositions 1 to 8 was measured for the amount of light irradiation required for curing the active-energy-ray-curable composition using a viscoelasticity measuring apparatus (available from Anton Paar Japan K.K., "MCR302") in the following manner and was evaluated for curing ability. The results are presented in Table 2.

Above a glass stage, a gap (10 μm) was provided. A planar measurement jig having a diameter of 20 mm was provided.

From Table 2, with respect to the amount of light irradiation required for curing the active-energy-ray-curable composition, comparison between Example 1 and Comparative Example 1, comparison between Example 2 and Comparative Example 2, comparison between Example 3 and Comparative Example 3, and comparison between Example 4 and Comparative Example 4 indicate that the active-energy-ray-curable compositions of Examples each have a lower amount of light irradiation compared to those of Comparative Examples and are excellent in curing ability. Here, in each of the comparisons, the kind of polymerizable monomer and the total amount of the polymerization initiator(s) of the Example are the same as those of the corresponding Comparative Example.

Moreover, in the comparison between Example 2 and Comparative Example 2 and the comparison between Example 4 and Comparative Example 4, the active-energy-ray-curable compositions of both Examples reached higher storage elastic modulus, indicating that cured materials excellent in hardness are produced in these Examples.

Examples 5 to 9

<Preparation of Active-Energy-Ray-Curable Compositions 9 to 13>

Active-energy-ray-curable compositions 9 to 13 were prepared in the same manner as in Example 1 except that the formulation and the amounts in Example 1 were changed to formulations and amounts presented in the following Table 3.

<Formation of Images of Active-Energy-Ray-Curable Compositions 9 to 13 through Inkjeting>

Each of the active-energy-ray-curable compositions 9 to 13 was loaded into a composition stored container made of plastic and was incorporated into an image forming apparatus including: an inkjet head (available from RICOH Company, Ltd., "MH5440") serving as a discharging unit; an ultraviolet irradiating apparatus (available from Fusion Systems Japan, "LH6") serving as a unit configured to emit active energy rays; a controller configured to control discharging; and a supply path from the composition stored container to the inkjet head. The active-energy-ray-curable composition was discharged from the inkjet head onto a polycarbonate substrate, which is commercially available product, so as to form a film having a thickness of 40 μm and was irradiated with light of 500 mJ/cm$^2$ by the ultraviolet irradiating apparatus to form a printed image.

The results of printed images observed are presented in Table 3.

All of the active-energy-ray-curable compositions 9 to 13 could achieve favorable printed images having a transparent gloss.

TABLE 3

|  |  | Examples. | | | | |
| --- | --- | --- | --- | --- | --- | --- |
|  |  | 5 | 6 | 7 | 8 | 9 |
| Active-energy-ray-curable composition Nos. |  | 9 | 10 | 11 | 12 | 13 |
| Polymerizable monomers (A1) | A1-1 | 20.0 |  |  | 40.0 | 32.9 |
|  | A1-2 | 30.0 |  | 30.0 |  |  |
|  | A1-3 |  | 50.0 |  | 20.0 |  |
|  | A1-4 |  | 20.0 | 30.0 |  | 50.0 |
| Polymerizable monomers (A2) | A2-1 | 42.9 |  | 22.9 |  |  |
|  | A2-2 |  | 10.0 |  |  |  |
| Polymerizable monomer (A3) | A3-1 |  | 6.9 |  | 14.9 |  |
| Polymerization initiators (B1) | B1-1 | 1.0 | 10.0 |  | 5.0 | 15.0 |
|  | B1-2 |  |  | 12.0 | 5.0 |  |
| Polymerization initiator (B2) | B2-1 | 1.0 | 3.0 | 5.0 | 15.0 | 1.0 |
| Polymerization initiators (B3) | B3-1 |  |  |  |  | 1.0 |
|  | B3-2 | 2.5 |  |  |  |  |
|  | B3-3 | 2.5 |  |  |  |  |
| Surfactant |  | 0.1 | 0.1 | 0.1 | 0.1 | 0.1 |
| Total (% by mass) |  | 100.0 | 100.0 | 100.0 | 100.0 | 100.0 |
| Image formation through inkjeting |  | Good | Good | Good | Good | Good |

Aspects of the present disclosure are as follows, for example.

<1> An active-energy-ray-curable composition including: polymerizable monomer (A1) containing one (meth)acryloyl group; acylphosphine oxide-based polymerization initiator (B1); and acridone-based polymerization initiator (B2),
wherein an amount of the polymerizable monomer (A1) containing one (meth)acryloyl group is from 50.0% by mass through 99.8% by mass.
<2> The active-energy-ray-curable composition according to <1>, wherein an amount of the acylphosphine oxide-based polymerization initiator (B1) is from 0.1% by mass through 15.0% by mass, and wherein an amount of the acridone-based polymerization initiator (B2) is from 0.1% by mass through 15.0% by mass.
<3> The active-energy-ray-curable composition according to <1> or <2>, further including polymerizable monomer (A2) containing two or more (meth)acryloyl groups.
<4> The active-energy-ray-curable composition according to any one of <1> to <3>, further including polymerization initiator (B3) other than the acylphosphine oxide-based polymerization initiator (B1) and the acridone-based polymerization initiator (B2).
<5> The active-energy-ray-curable composition according to any one of <1> to <4>,
wherein the acylphosphine oxide-based polymerization initiator (B1) is phenylbis(2,4,6-trimethylbenzoyl)phosphine=oxide or diphenyl(2,4,6-trimethylbenzoyl)phosphine=oxide.
<6> The active-energy-ray-curable composition according to any one of <1> to <5>,
wherein the acridone-based polymerization initiator (B2) is 10-buthyl-2-chloro-9(10H)-acridone.
<7> A cured material,
wherein the cured material is obtained by curing the active-energy-ray-curable composition according to any one of <1> to <6>.
<8> A composition stored container including:
the active-energy-ray-curable composition according to any one of <1> to <6>; and
a container including the active-energy-ray-curable composition.
<9> A two-dimensional or three-dimensional image forming apparatus including:
the composition stored container according to <8>;
a unit configured to discharge the active-energy-ray-curable composition stored in the composition stored container; and
a unit configured to irradiate the active-energy-ray-curable composition discharged with active energy rays.
<10> A two-dimensional or three-dimensional image forming method including:
discharging the active-energy-ray-curable composition according to any one of <1> to <6>; and
irradiating the active-energy-ray-curable composition discharged with active energy rays.

What is claimed is:

1. An active-energy-ray-curable composition, comprising:
a polymerizable monomer (A1) comprising one (meth)acryloyl group;
an acylphosphine oxide-based polymerization initiator (B1); and
an acridone-based polymerization initiator (B2),
wherein:
an amount of the polymerizable monomer (A1) in the active-energy-ray-curable composition is from 50.0% by mass through 99.8% by mass;

an amount of the acylphosphine oxide-based polymerization initiator (B1) in the active-energy-ray-curable composition is from 0.1% by mass through 15.0% by mass; and an amount of the acridone-based polymerization initiator (B2) in the active-energy-ray-curable composition is from 0.1% by mass through 15.0% by mass.

2. The active-energy-ray-curable composition according to claim 1, wherein:

the amount of the acylphosphine oxide-based polymerization initiator (B1) in the active-energy-ray-curable composition is from 0.1% by mass through 12.0% by mass; and the amount of the acridone-based polymerization initiator (B2) in the active-energy-ray-curable composition is from 0.1% by mass through 12.0% by mass.

3. The active-energy-ray-curable composition according to claim 1, further comprising:

a polymerizable monomer (A2) comprising two or more (meth)acryloyl groups.

4. The active-energy-ray-curable composition according to claim 1, further comprising:

a polymerization initiator (B3) other than the acylphosphine oxide-based polymerization initiator (B1) and the acridone-based polymerization initiator (B2).

5. The active-energy-ray-curable composition according to claim 1, wherein the acylphosphine oxide-based polymerization initiator (B1) is phenylbis(2,4,6-trimethylbenzoyl)phosphine=oxide or diphenyl(2,4,6-trimethylbenzoyl)phosphine=oxide.

6. The active-energy-ray-curable composition according to claim 1, wherein the acridone-based polymerization initiator (B2) is 10-buthyl-2-chloro-9(10H)-acridone.

7. A cured material, which is obtained by curing the active-energy-ray-curable composition according to claim 1.

8. A composition stored container, comprising:
an active-energy-ray-curable composition; and
a container including the active-energy-ray-curable composition,
wherein:
the active-energy-ray-curable composition comprises:
a polymerizable monomer (A1) containing one (meth)acryloyl group;
an acylphosphine oxide-based polymerization initiator (B1); and
an acridone-based polymerization initiator (B2);
an amount of the polymerizable monomer (A1) in the active-energy-ray-curable composition is from 50.0% by mass through 99.8% by mass;
an amount of the acylphosphine oxide-based polymerization initiator (B1) in the active-energy-ray-curable composition is from 0.1% by mass through 15.0% by mass; and
an amount of the acridone-based polymerization initiator (B2) in the active-energy-ray-curable composition is from 0.1% by mass through 15.0% by mass.

9. A two-dimensional or three-dimensional image forming apparatus, comprising:
the composition stored container according to claim 8;
a unit configured to discharge the active-energy-ray-curable composition stored in the composition stored container; and
a unit configured to irradiate the active-energy-ray-curable composition discharged with active energy rays.

10. A two-dimensional or three-dimensional image forming method, comprising:
discharging an active-energy-ray-curable composition; and
irradiating the active-energy-ray-curable composition discharged with active energy rays,
wherein:
the active-energy-ray-curable composition comprises:
a polymerizable monomer (A1) containing one (meth)acryloyl group;
an acylphosphine oxide-based polymerization initiator (B1); and
an acridone-based polymerization initiator (B2);
an amount of the polymerizable monomer (A1) in the active-energy-ray-curable composition is from 50.0% by mass through 99.8% by mass;
an amount of the acylphosphine oxide-based polymerization initiator (B1) in the active-energy-ray-curable composition is from 0.1% by mass through 15.0% by mass; and
an amount of the acridone-based polymerization initiator (B2) in the active-energy-ray-curable composition is from 0.1% by mass through 15.0% by mass.

11. The two-dimensional or three-dimensional image forming method according to claim 10, wherein:
the amount of the acylphosphine oxide-based polymerization initiator (B1) in the active-energy-ray-curable composition is from 0.1% by mass through 12.0% by mass; and
the amount of the acridone-based polymerization initiator (B2) in the active-energy-ray-curable composition is from 0.1% by mass through 12.0% by mass.

12. The two-dimensional or three-dimensional image forming method according to claim 10, wherein the active-energy-ray-curable composition further comprises:
a polymerizable monomer (A2) comprising two or more (meth)acryloyl groups.

13. The two-dimensional or three-dimensional image forming method according to claim 10, wherein the active-energy-ray-curable composition further comprises:
a polymerization initiator (B3) other than the acylphosphine oxide-based polymerization initiator (B1) and the acridone-based polymerization initiator (B2).

14. The two-dimensional or three-dimensional image forming method according to claim 10, wherein the acylphosphine oxide-based polymerization initiator (B1) is phenylbis(2,4,6-trimethylbenzoyl)phosphine=oxide or diphenyl(2,4,6-trimethylbenzoyl) phosphine=oxide.

15. The two-dimensional or three-dimensional image forming method according to claim 10, wherein the acridone-based polymerization initiator (B2) is 10-buthyl-2-chloro-9(10H)-acridone.

* * * * *